(12) United States Patent
Shiu et al.

(10) Patent No.: US 7,515,340 B1
(45) Date of Patent: Apr. 7, 2009

(54) THREE-DIMENSIONAL DISPLAY DEVICE

(75) Inventors: Jyh-Wen Shiu, Hsinchu County (TW); Wei-Yuan Cheng, Taipei County (TW); Cheng-Hsi Hsieh, Kaohshiung (TW); Kuo-Lung Lo, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/964,718

(22) Filed: Dec. 27, 2007

(30) Foreign Application Priority Data

Oct. 5, 2007 (TW) .............................. 96137460 A (51) Int. Cl.
  *G02B 27/44* (2006.01)
  *G02B 1/06* (2006.01)
  *G02B 27/22* (2006.01)

(52) U.S. Cl. .................... 359/569; 359/665; 359/462
(58) Field of Classification Search ................. 359/230, 359/462, 566, 569, 665
See application file for complete search history.

(56) References Cited

U.S. PATENT DOCUMENTS

| 4,717,949 A | 1/1988 | Eichenlaub |
| 7,394,598 B2 * | 7/2008 | Hendriks et al. ............ 359/665 |
| 2006/0158729 A1 | 7/2006 | Vissenberg et al. |

\* cited by examiner

*Primary Examiner*—William C Choi
(74) *Attorney, Agent, or Firm*—Jianq Chyun IP Office (57) ABSTRACT

A three-dimensional display device including a display panel and a modulatable electrowetting grating is provided. The display panel has a plurality of pixels. The modulatable electrowetting grating is disposed on the display panel, and has a plurality of electrowetting light valves corresponding to the pixels.

12 Claims, 9 Drawing Sheets

THREE-DIMENSIONAL DISPLAY DEVICE

CROSS-REFERENCE TO RELATED APPLICATION

This application claims the priority benefit of Taiwan application serial no. 96137460, filed on Oct. 5, 2007. The entirety of the above-mentioned patent application is hereby incorporated by reference herein and made a part of this specification.

BACKGROUND OF THE INVENTION

1. Field of the Invention

The present invention relates to a display device. More particularly, the present invention relates to a three-dimensional display device capable of displaying three-dimensional images.

2. Description of Related Art

As for the development of display technology, besides the development trend of being light, thin, and small, an object of displaying a three-dimensional image is also expected. Recently, three-dimensional display technologies can be approximately divided into a stereoscopic type that requires the viewers to wear specially-designed glasses and an auto-stereoscopic type directly viewed with naked eyes. The stereoscopic-type three-dimensional display technology has been mature, and it has been widely used on certain special applications, for example, military simulations or large-scale entertainments etc. However, due to the factors of being inconvenience and less comfortable, it is difficult for the stereoscopic-type three-dimensional display technology to become popular. Therefore, the auto-stereoscopic-type three-dimensional display technology has been gradually developed and becomes a new trend.

In a conventional three-dimensional image display, a fixed gating is disposed in front of the display panel, such that the viewer respectively views images corresponding to the display frame with the left eye and the right eye. It should be noted that, when the fixed gating is used as a processing mechanism for the three-dimensional image, the frame viewed by the viewer is achieved by dividing and spacing the display frame into left-eye and right-eye image display regions in space, which is a spatial-multiplexed manner. Therefore, although the display is made to have the three-dimensionally displaying effect, the resolution for the three-dimensional image display is significantly reduced.

Figure 1A:
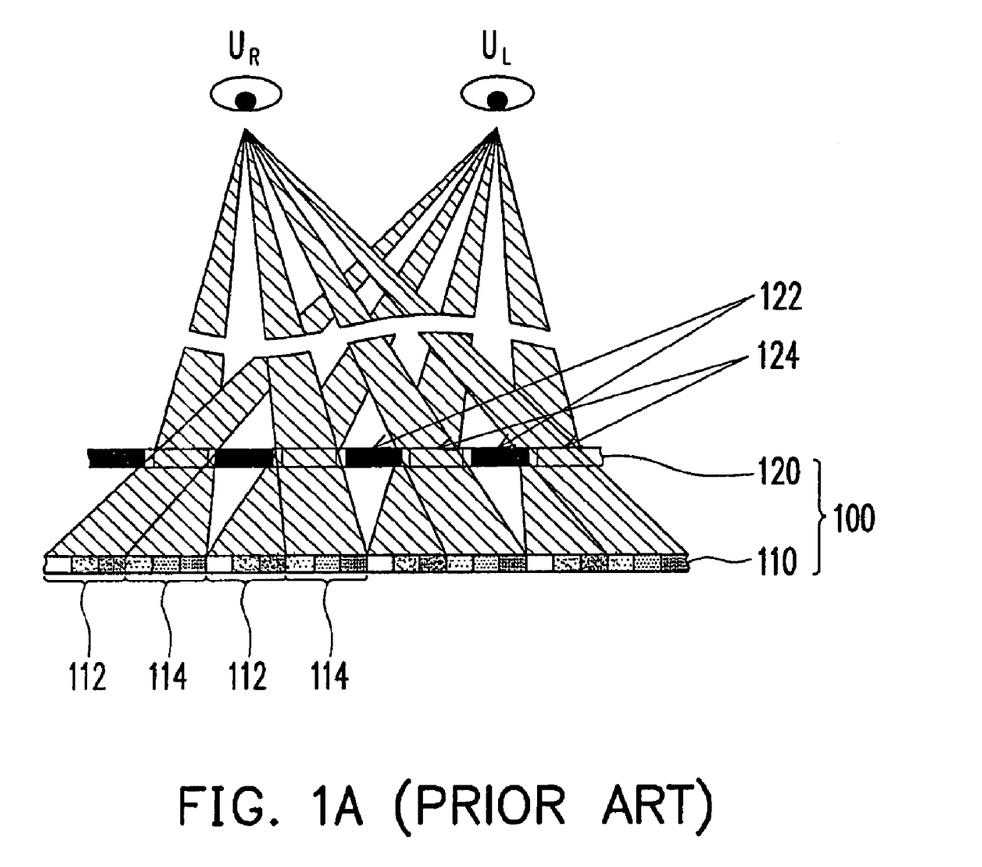
FIGS. 1A and 1B show a display mechanism for a conventional three-dimensional image display.
Figure 1B:
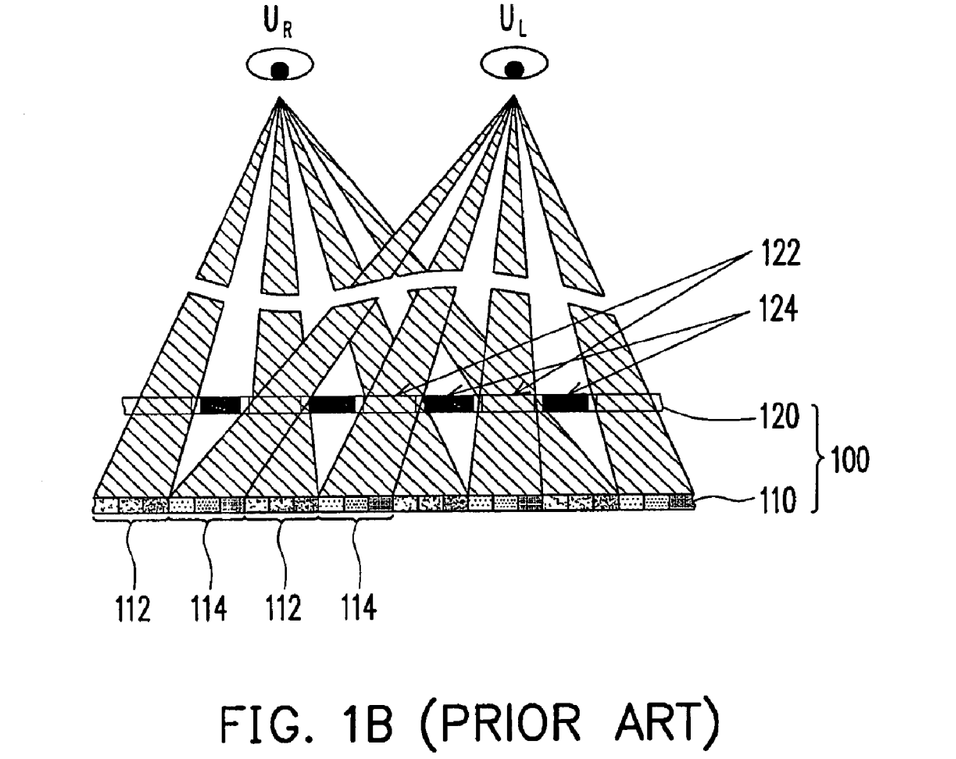

FIGS. 1A and 1B show a display mechanism for another conventional three-dimensional image display. Firstly, referring to FIG. 1A, a conventional three-dimensional image display 100 includes a display panel 110 and a liquid crystal barrier 120. The display panel 110 has a plurality of first display regions 112 and second display regions 114 that are arranged in a staggered way, and the liquid crystal barrier 120 has a plurality of first light valve regions 122 and second light valve regions 124 that are arranged in a staggered way.

As shown in FIG. 1A, in a first frame time, the first light valve regions 122 of the liquid crystal barrier 120 are in a shading state, and the second light valve regions 124 are in a transmissive state, so the right eye $U_R$ and left eye $U_L$ of the viewer respectively view the right eye frame displayed by the second display region 114 and the left eye frame displayed by the first display region 112 through the second light valve region 124 in the transmissive state.

Next, as shown in FIG. 1B, in a second frame time next to the first frame time, the first light valve regions 122 of the liquid crystal barrier 120 are in the transmissive state, and the second light valve regions 124 are in the shading state. Therefore, the right eye $U_R$ and left eye $U_L$ of the viewer respectively view the right eye frame displayed by the first display region 112 and the left eye frame displayed by the second display region 114 through the first light valve region 122 in the transmissive state. Therefore, after the first frame time and the second frame time, due to visual staying effect, the viewer can view the complete three-dimensional image.

Generally, the liquid crystal barrier 120 in the three-dimensional image display 100 adopts an optical controlled birefringence mode (OCB mode), and the liquid crystal barrier 120 needs to additionally adhere a polarizing plate, as a result, the display brightness of the three-dimensional image display cannot be effectively improved. In addition, since the liquid crystal is taken as a medium, the designer must perform phase retardation compensation on the image that passes through the liquid crystal barrier 120. Therefore, a complex optical compensation design is required for the conventional three-dimensional image display.

SUMMARY OF THE INVENTION

Accordingly, the present invention is related to a three-dimensional display device, which includes a display panel and a modulatable electrowetting grating. The display panel has a plurality of pixels. The modulatable electrowetting grating is disposed on the display panel, and has a plurality of electrowetting light valves corresponding to the pixels.

In the present invention, the modulatable electrowetting grating is used to make the display panel achieve the three-dimensional displaying effect, so as to reduce image phase retardation compensation procedure, and to reduce the cost.

In order to make the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
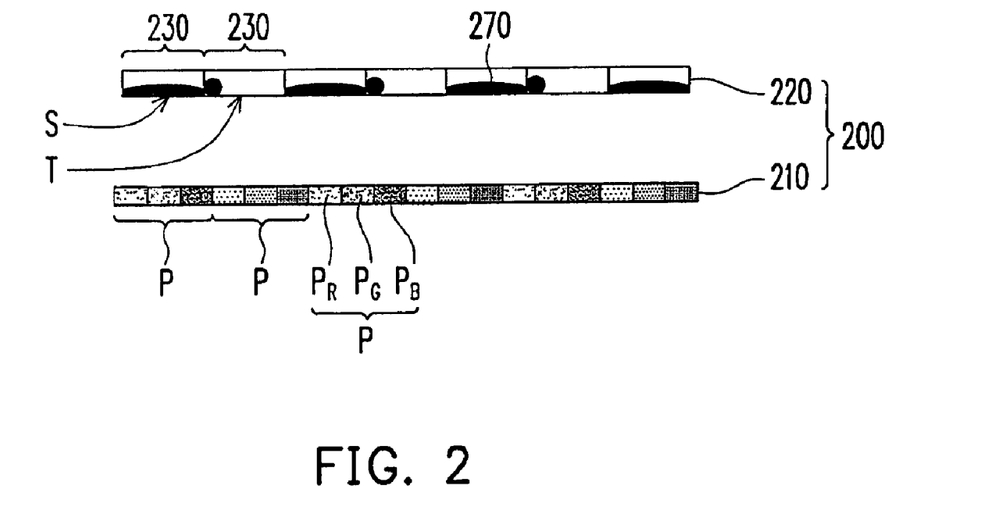
FIG. 2 shows a three-dimensional display device according to the present invention.

FIG. 2 shows a three-dimensional display device according to the present invention. Referring to FIG. 2, a three-dimensional display device 200 includes a display panel 210 and a modulatable electrowetting grating 220. The display panel 210 has a plurality of pixels P. The display panel 210 is, for example, a liquid crystal display panel, a plasma display panel, or an organic light emitting display panel, and the liquid crystal display panel is used as an example for illustration herein. For example, each pixel P includes a red sub-pixel $P_R$, a green sub-pixel $P_G$, and a blue sub-pixel $P_B$. The modulatable electrowetting grating 220 is disposed on the display panel 210, and has a plurality of electrowetting light valves 230 corresponding to the pixels P. It should be noted that, as shown in FIG. 2, each electrowetting light valve 230 has an opaque hydrophobic flowing medium 270, and each electrowetting light valve 230 generates a transmissive state T and a shading state S through the hydrophobic flowing medium 270.

Figure 3A:
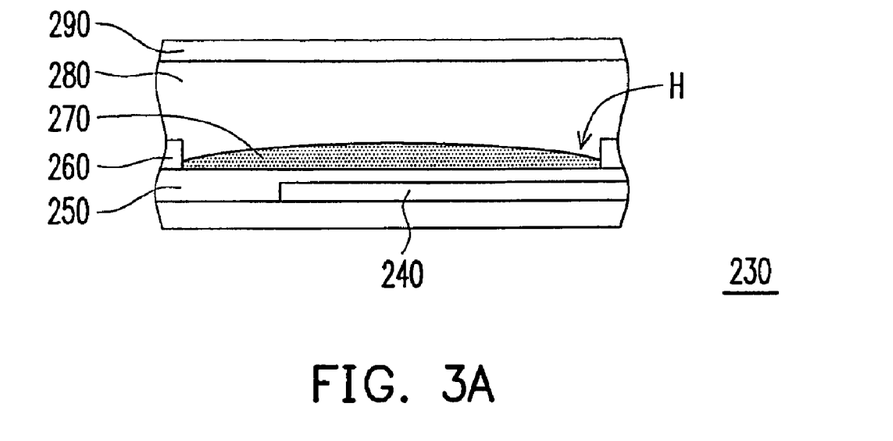
FIG. 3A is a schematic view of an electrowetting light valve under a shading state according to the present invention.

FIG. 3A is a schematic view of an electrowetting light valve under a shading state according to the present invention. Referring to FIG. 3A, the electrowetting light valve 230 includes a first transparent electrode 240, a hydrophobic insulation layer 250, a patterned dielectric layer 260, a hydrophobic flowing medium 270, a hydrophilic flowing medium 280, and a second transparent electrode 290. The hydrophobic insulation layer 250 is disposed on the first transparent electrode 240, in which the hydrophobic insulation layer 250 is made of a hydrophobic polymer, for example, fluoropolymer. The patterned dielectric layer 260 is disposed on the hydrophobic insulation layer 250, and the patterned dielectric layer 260 has an opening H located above the first transparent electrode 240. Specifically, in consideration of the flowing smoothness for the hydrophobic flowing medium 270 on the patterned dielectric layer 260, the patterned dielectric layer 260 generally adopts a hydrophilic material, for example, hydrophilic photoresist.

Referring to FIG. 3A, the hydrophobic flowing medium 270 is disposed on the hydrophobic insulation layer 250 exposed by of the opening H. In this embodiment, the hydrophobic flowing medium 270 is an opaque hydrophobic flowing medium 270, for example, dye-containing hydrophobic solution such as decane, dodecane, n-butylbenzene or any combination thereof etc., and the color of the dye may be selected to be an opaque color, for example, black, dark blue, or dark green. The hydrophilic flowing medium 280 encapsulates the hydrophobic flowing medium 270 and the patterned dielectric layer 260, and the hydrophilic flowing medium 280 may be water, sodium chloride aqueous solution, potassium chloride aqueous solution, or another suitable hydrophilic material. The second transparent electrode 290 is disposed on the hydrophilic flowing medium 280, and the first transparent electrode 240 and the second transparent electrode 290 are made of, for example, indium tin oxide (ITO) or indium zinc oxide (IZO). In addition, in other embodiments, the electrowetting light valve 230 may further include a dielectric layer (not shown) disposed between the first transparent electrode 240 and the hydrophobic insulation layer 250.

Figure 3B:
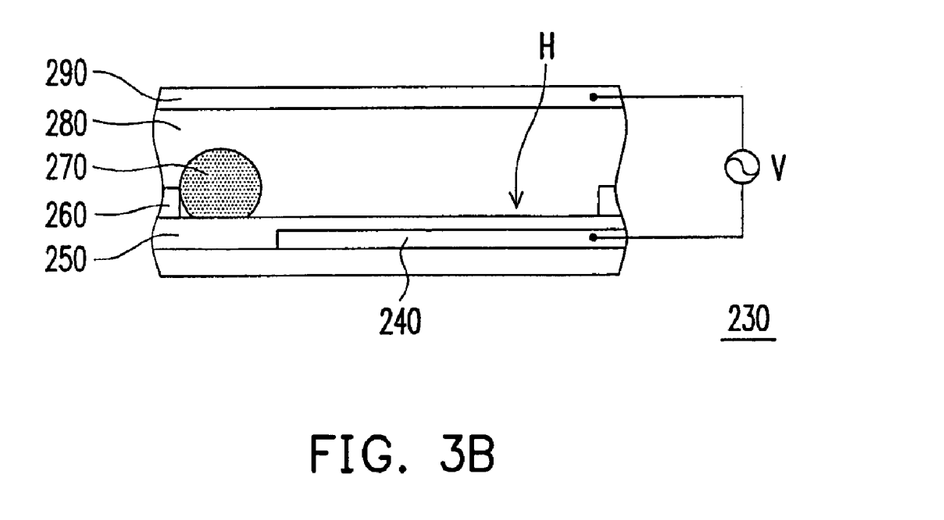
FIG. 3B is a schematic view of an electrowetting light valve under a transmissive state according to the present invention.

FIG. 3B is a schematic view of an electrowetting light valve under a transmissive state according to the present invention. Referring to FIG. 3B, when a voltage difference V exists between the first transparent electrode 240 and the second transparent electrode 290, the hydrophilic flowing medium 280 contacts with the hydrophobic insulation layer 250, so as to change the contact area between the hydrophobic flowing medium 270 and the hydrophobic insulation layer 250, such that the opaque hydrophobic flowing medium 270 gathers on the hydrophobic insulation layer 250 to make the electrowetting light valve 230 be in the transmissive state T. Therefore, the shading state S or the transmissive state T of each electrowetting light valve 230 can be determined by applying the voltage or not, as shown in FIGS. 3A and 3B. The electrowetting light valves 230 of the modulatable electrowetting grating 220 has an advantage of quick response, without resulting in polarization of the light rays. On another aspect, the switching period for each electrowetting light valve 230 of the modulatable electrowetting grating 220 may be modulated according to the frame refreshing frequency of the display panel 210. Therefore, the three-dimensional display device 200 of the present invention has an advantage of maintaining the original resolution of the display panel 210, without additionally adhering a polarizing plate, so that the display brightness of the three-dimensional display device 200 of the present invention is higher than that of the conventional three-dimensional image display 100 (as shown in FIG. 1A).

Figure 4A:
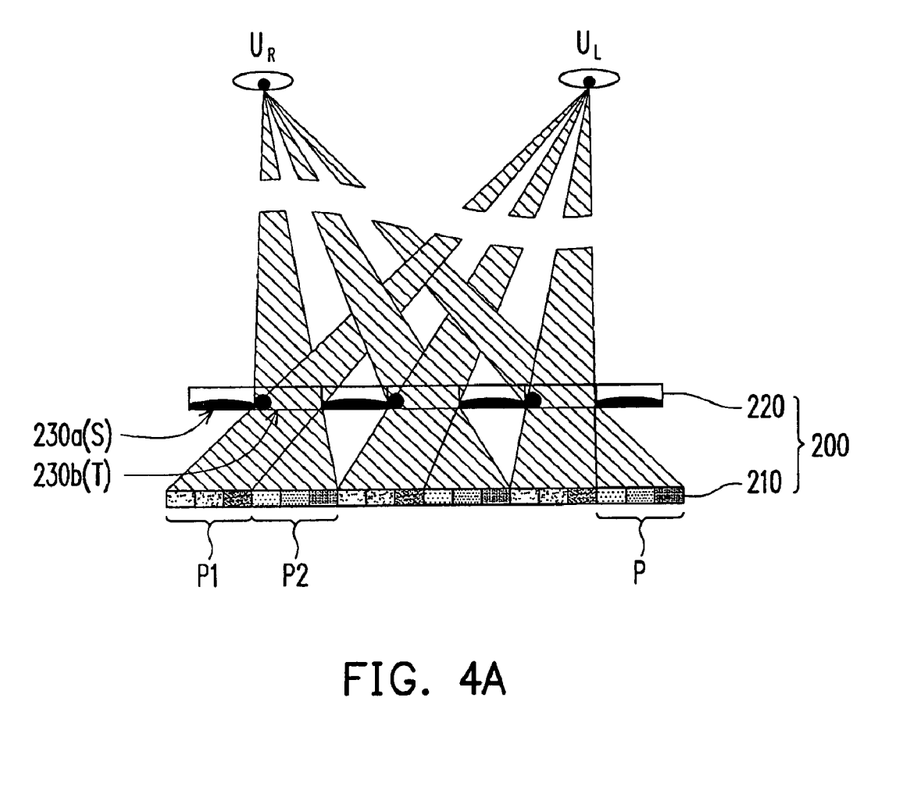
FIGS. 4A and 4B show a display mechanism for a three-dimensional display device according to the present invention.
Figure 4B:
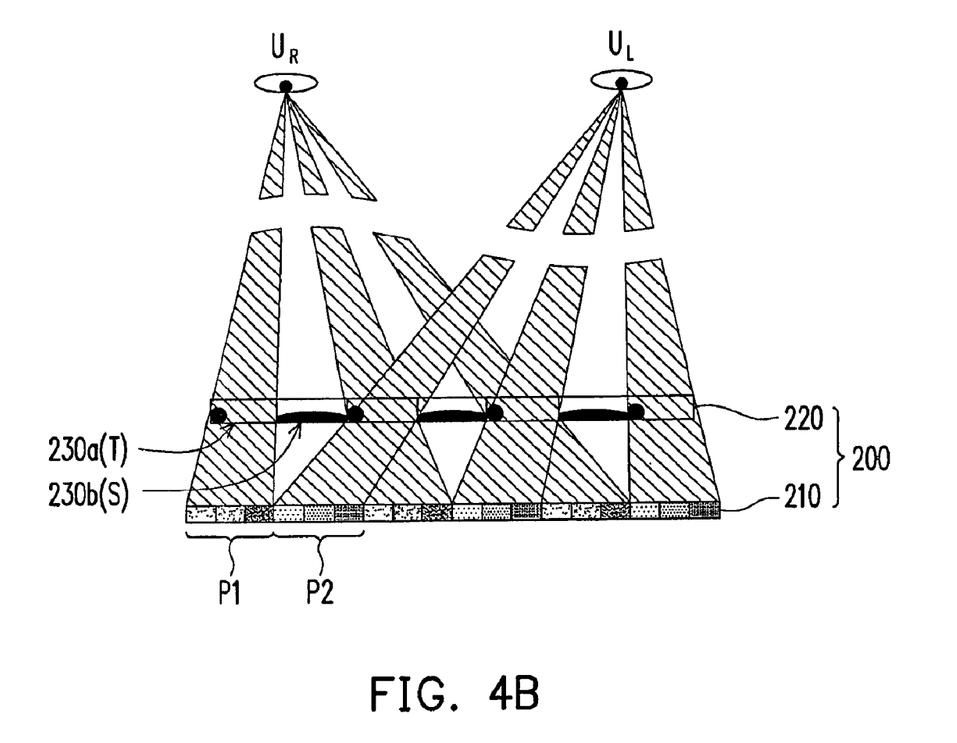

FIGS. 4A and 4B show a display mechanism for a three-dimensional display device according to the present invention. The three-dimensional display device 200 in this embodiment includes a modulatable electrowetting grating 220 formed by the electrowetting light valves 230 and a display panel 210. Referring to FIGS. 4A and 4B, the number of the electrowetting light valves 230 is substantially the same as that of the pixels P. Referring to FIG. 4A, in a first sub-frame time, the first electrowetting light valve 230a is in the shading state S, and the second electrowetting light valve 230b is in the transmissive state T. At this time, the image for left eye displayed by the first pixel P1 is viewed by the left eye $U_L$ of the viewer through the second electrowetting light valve 230b, and the image for right eye displayed by the second pixel P2 is viewed by the right eye $U_R$ of the viewer through the second electrowetting light valve 230b.

Referring to FIG. 4B, in a second sub-frame time next to the first sub-frame time, the first electrowetting light valve 230a is in the transmissive state T, and the second electrowetting light valve 230b is in the shading state S. At this time, the image for right eye displayed by the first pixel P1 is viewed by the right eye $U_R$ of the viewer through the first electrowetting light valve 230a, and the image for left eye displayed by the second pixel P2 is viewed by the left eye $U_L$ of the viewer through the first electrowetting light valve 230a. However, the display panel 210 is formed by a plurality of first pixels P1 and second pixels P2 that are arranged in a staggered way. Therefore, after the first sub-frame time and the second sub-frame time, the viewer can view the complete three-dimensional image due to the visual staying effect.

It should be noted that, the switching frequency of the modulatable electrowetting grating 220 can be adjusted according to the frame refreshing frequency of the display panel 210, such that the original resolution is maintained when the display panel 210 is involved in the three-dimensional display. For example, when the frame refreshing frequency of the display panel 210 is 60 Hz, the switching frequency of the modulatable electrowetting grating 220 may be 120 Hz. In other words, when the frame time for the display panel 210 is 1/60 second, the first sub-frame time and the second sub-frame time can be adjusted to be 1/120 second, such that the transmissive state T and the shading state S of the electrowetting grating are instantaneously switched in the frame time of the display panel 210, so as to make the viewer view all the pixels P in the original frame time of the display panel 210. Therefore, the modulatable electrowetting grating 220 of the present invention not only can prevent the insufficient brightness of the three-dimensional image display device 200 caused by adhering a polarizing plate, but also can avoid the phase retardation occurring to the display images.

Figure 5A:
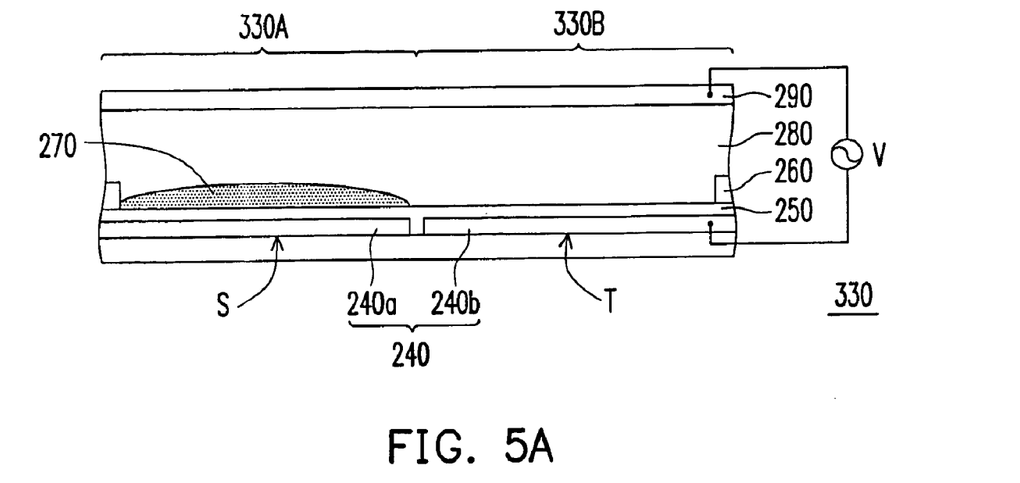
FIGS. 5A and 5B are schematic views of another electrowetting light valve according to the present invention.
Figure 5B:
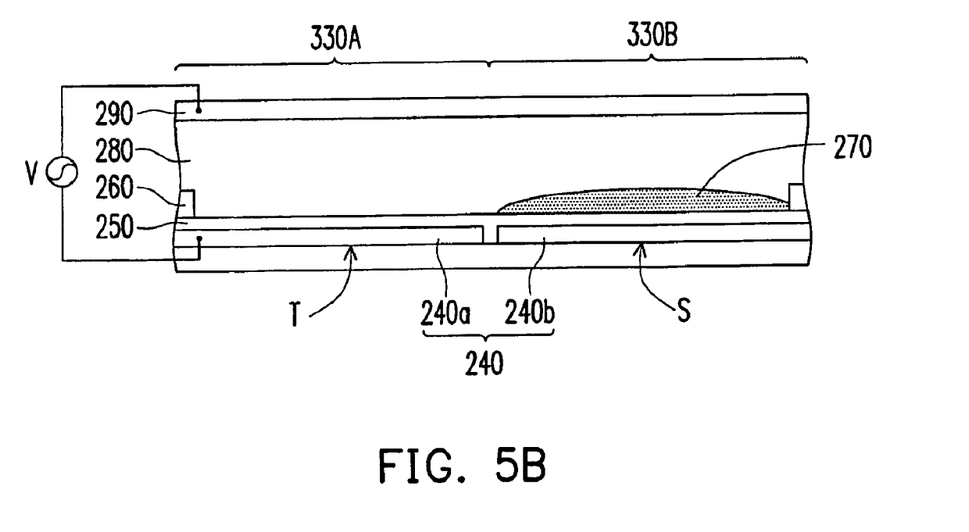

FIGS. 5A and 5B are schematic views of another electrowetting light valve according to the present invention. Referring to FIGS. 5A and 5B, components of an electrowetting light valve 330 are similar to that of the electrowetting light valve 230 of FIG. 3A, and the main difference therebetween lies in the distribution manner of the first transparent electrode 240. As shown in FIGS. 5A and 5B, the first transparent electrode 240 includes a plurality of sub-electrodes electrically insulated with each other, and in this embodiment, the first transparent electrode 240 includes, for example, two sub-electrodes electrically insulated with each other. As shown in FIGS. 5A and 5B, the first transparent electrode 240 includes a left sub-electrode 240a and a right sub-electrode 240b. Referring to FIG. 5A, when a voltage difference V is applied between the right sub-electrode 240b and the second transparent electrode 290, the hydrophobic flowing medium 270 is driven by the voltage difference to gather towards the region of the left sub-electrode 240a, such that each electrowetting light valve 330 generates a shading region S corresponding to the hydrophobic flowing medium 270 at the left sub-electrode region 330A, and generates a transmissive region T at the right sub-electrode region 330B. FIG. 5B shows the electrowetting light valve 330 when a voltage difference V is applied between the left sub-electrode 240a and the second transparent electrode 290. Similarly, the electrowetting light valve 330 generates the transmissive region T at the left sub-electrode region 330A, and generates the shading region S corresponding to the hydrophobic flowing medium 270 at the right sub-electrode region 330B.

Figure 6A:
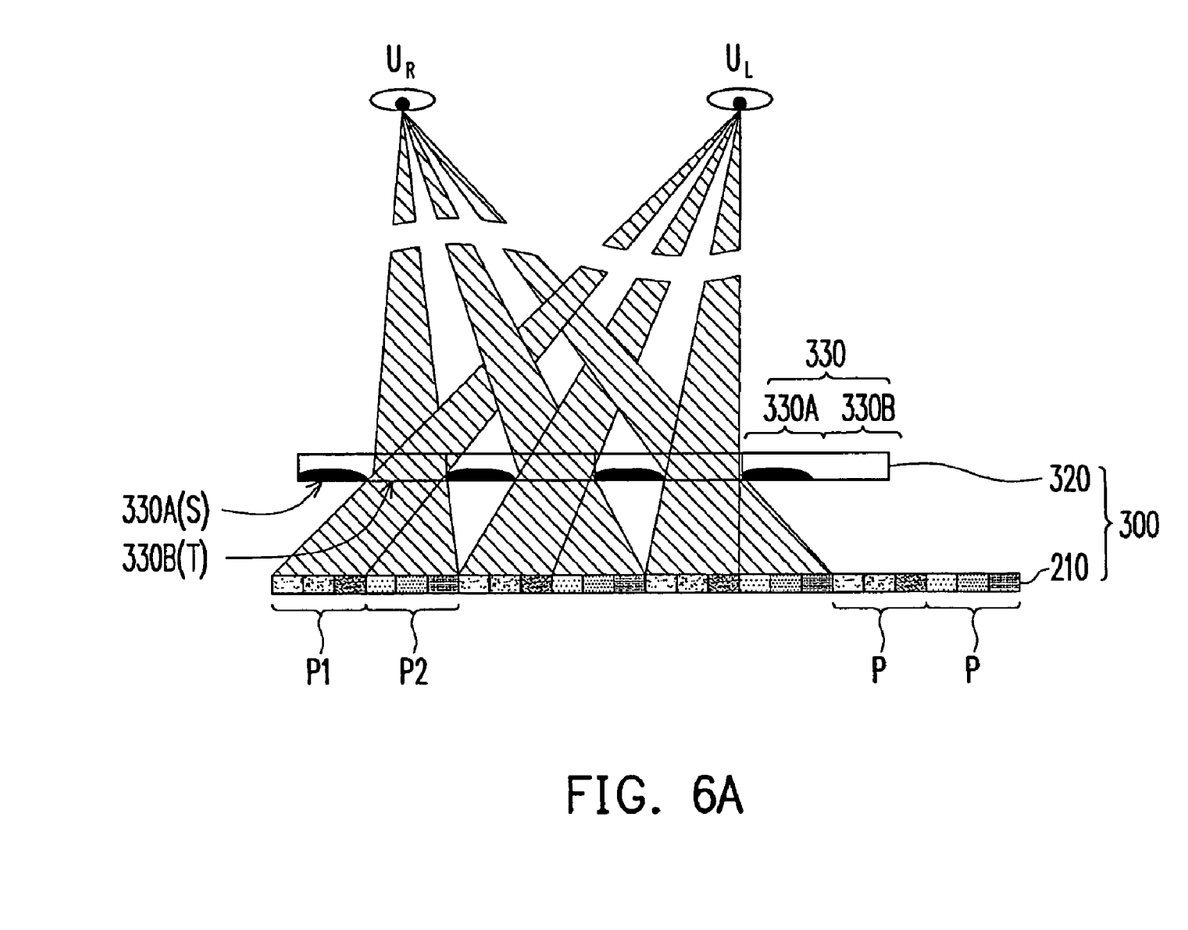
FIGS. 6A and 6B show a display mechanism for another three-dimensional display device.
Figure 6B:
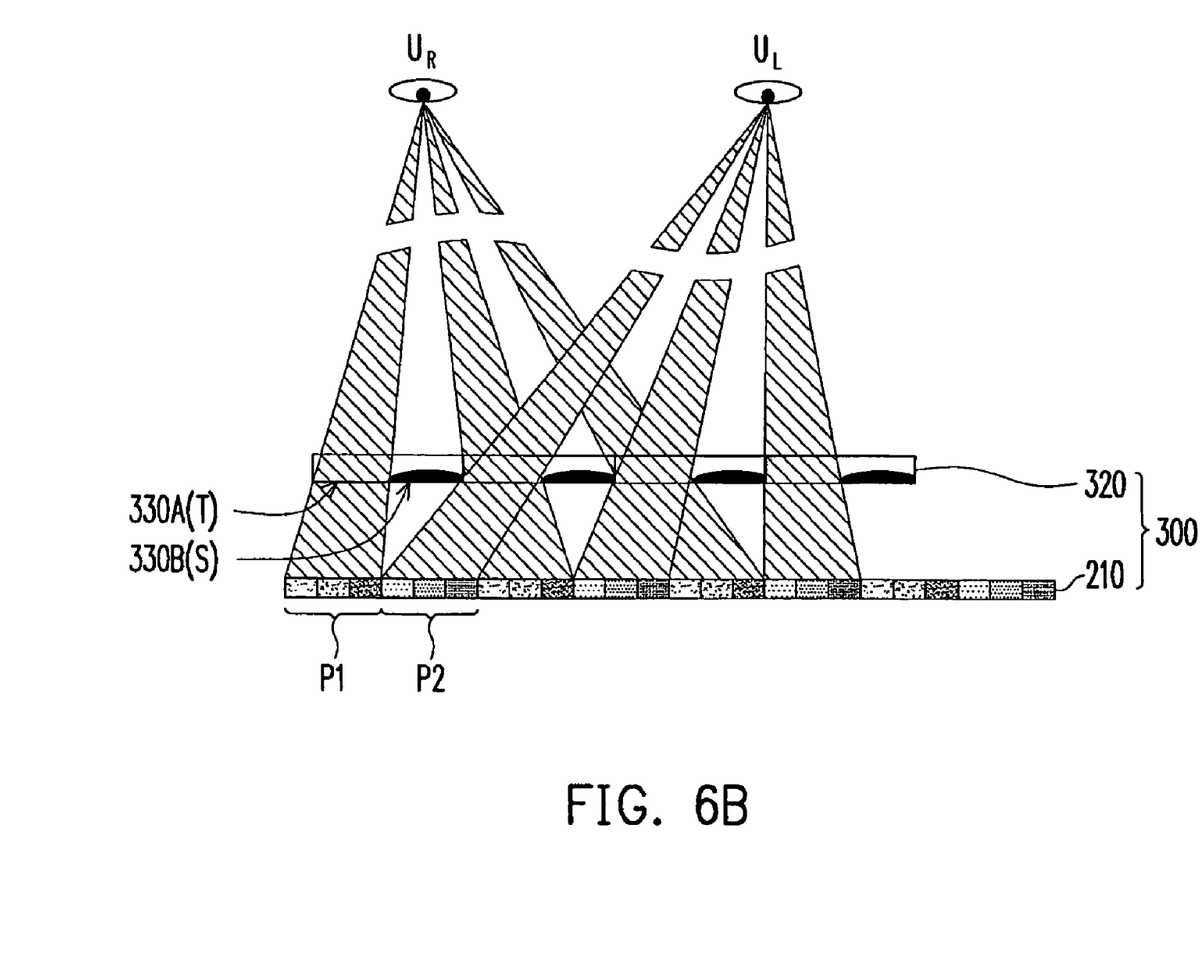

FIGS. 6A and 6B show a display mechanism for another three-dimensional display device. A three-dimensional display device 300 in this embodiment includes a modulatable electrowetting grating 320 formed by the electrowetting light valves 330 and a display panel 210. Referring to FIGS. 6A and 6B, two sub-electrode regions 330A and 330B of each electrowetting light valve 330 respectively correspond to two pixels P, so that the number of the electrowetting light valves 330 is a half of the number of the pixels P. Referring to FIG. 6A, in the first sub-frame time, the sub-electrode region 330A of each electrowetting light valve 330 generate a shading region S, and the sub-electrode region 330B of each electrowetting light valve 330 generates a transmissive region T, such that the image for left eye displayed by the first pixel P1 of the display panel 210 is viewed by the left eye $U_L$ of the viewer through the sub-electrode region 330B, and the image for right eye displayed by the second pixel P2 is viewed by the right eye $U_R$ of the viewer through the sub-electrode region 330B.

Next, referring to FIG. 6B, in the second sub-frame time next to the first sub-frame time, the sub-electrode region 330A of each electrowetting light valve 330 generates a transmissive region T, and the sub-electrode region 330B generates a shading region S, such that the image for right eye displayed by the first pixel P1 of the display panel 210 is viewed by the right eye $U_R$ of the viewer through the sub-electrode region 330A, and the image for left eye displayed by the second pixel P2 is viewed by the left eye $U_L$ of the viewer through the sub-electrode region 330A. However, the display panel 210 is formed by a plurality of first pixels P1 and second pixels P2 that are arranged in a staggered way. Therefore, after the neighboring first sub-frame time and second sub-frame time have elapsed, the viewer can view the complete three-dimensional image due to the visual staying effect. It can be known from the display mechanism of FIGS. 6A and 6B, the modulatable electrowetting grating 320 of this embodiment has an advantage of high transmittance, such that the brightness of the three-dimensional display devices 200 and 300 is further improved, without requiring complex optical compensation procedures.

Based on the above descriptions, in the present invention, the modulatable electrowetting grating is used to make the display panel achieve the three-dimensional displaying effect. The modulatable electrowetting grating has an advantage of quick switching between the transmissive state and the shading state, so as to solve the problem that the resolution of the three-dimensional display device is reduced. In addition, the polarization phenomenon does not occur to the display images when they pass through the modulatable electrowetting grating, so it is not necessary to perform compensation for the image phase retardation, and thus, the present invention has advantages of low manufacturing cost and high yield.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-dimensional display device, comprising:
a display panel, having a plurality of pixels; and
a modulatable electrowetting grating, disposed on the display panel, wherein the modulatable electrowetting grating has a plurality of electrowetting light valves corresponding to the pixels.

2. The three-dimensional display device as claimed in claim 1, wherein the display panel is a liquid crystal display panel, a plasma display panel, or an organic light emitting display panel.

3. The three-dimensional display device as claimed in claim 1, wherein each pixel comprises a red sub-pixel, a green sub-pixel, and a blue sub-pixel.

4. The three-dimensional display device as claimed in claim 1, wherein each electrowetting light valve has an opaque hydrophobic flowing medium, and each electrowetting light valve generates a transmissive state and a shading state through the hydrophobic flowing medium.

5. The three-dimensional display device as claimed in claim 1, wherein a number of the electrowetting light valves is substantially the same as a number of the pixels.

6. The three-dimensional display device as claimed in claim 1, wherein each electrowetting light valve comprises:
a first transparent electrode;
a hydrophobic insulation layer, disposed on the first transparent electrode;
a patterned dielectric layer, disposed on the hydrophobic insulation layer, wherein the patterned dielectric layer has an opening located above the first transparent electrode;
a hydrophobic flowing medium, disposed on the hydrophobic insulation layer exposed by the opening;
a hydrophilic flowing medium, for encapsulating the hydrophobic flowing medium and the patterned dielectric layer; and
a second transparent electrode, disposed on the hydrophilic flowing medium, wherein the hydrophilic flowing medium contacts with the hydrophobic insulation layer when a voltage difference exists between the first transparent electrode and the second transparent electrode, so as to change a contact area between the hydrophobic flowing medium and the hydrophobic insulation layer.

7. The three-dimensional display device as claimed in claim 6, wherein the first transparent electrode in each electrowetting light valve comprises two sub-electrodes electrically insulated with each other; when a voltage difference is applied between one of the sub-electrodes and the second transparent electrode, the hydrophobic flowing medium is driven by the voltage difference to gather towards a region of the other sub-electrode, such that each electrowetting light valve generates a shading region corresponding to the hydrophobic flowing medium and a transmissive region adjacent to the shading region.

8. The three-dimensional display device as claimed in claim 7, wherein a number of the electrowetting light valves is a half of a number of the pixels.

9. The three-dimensional display device as claimed in claim 6, wherein a material of the hydrophobic insulation layer comprises fluoropolymer.

10. The three-dimensional display device as claimed in claim 6, wherein a material of the patterned dielectric layer comprises photoresist.

11. The three-dimensional display device as claimed in claim 6, further comprising a dielectric layer, disposed between the first transparent electrode and the hydrophobic insulation layer.

12. The three-dimensional display device as claimed in claim 1, wherein the pixels comprise:
a plurality of first pixels; and
a plurality of second pixels, wherein the first pixels and the second pixels are arranged in a staggered way.

* * * * *